US012810296B2

(12) United States Patent
Banks et al.

(10) Patent No.: US 12,810,296 B2
(45) Date of Patent: Nov. 24, 2026

(54) SYSTEMS AND METHODS FOR CLOUD BASED PIN PAD TRANSACTION GENERATION

(71) Applicant: Worldpay, LLC, Symmes Township, OH (US)

(72) Inventors: Walter Banks, Chandler, AZ (US); Christopher Guthrie, Phoenix, AZ (US)

(73) Assignee: Worldpay, LLC, Symmes Township, OH (US)

( * ) Notice: Subject to any disclaimer, the term of this patent is extended or adjusted under 35 U.S.C. 154(b) by 243 days.

(21) Appl. No.: 18/239,831

(22) Filed: Aug. 30, 2023

(65) Prior Publication Data

US 2023/0410109 A1 Dec. 21, 2023

Related U.S. Application Data

(63) Continuation of application No. 15/662,516, filed on Jul. 28, 2017, now Pat. No. 11,775,970.

(51) Int. Cl.
*G06Q 20/40* (2012.01)
*G06Q 20/20* (2012.01)

(52) U.S. Cl.
CPC ......... *G06Q 20/4012* (2013.01); *G06Q 20/20* (2013.01); *G06Q 2220/00* (2013.01)

(58) Field of Classification Search
CPC .................... G06Q 20/00–425; H04L 9/00–50
See application file for complete search history.

(56) References Cited

U.S. PATENT DOCUMENTS

| | | | | |
|---|---|---|---|---|
| 10,534,680 | B1 | 1/2020 | Wood | |
| 2002/0099843 | A1 * | 7/2002 | Fruchtman .............. | G06F 9/466 707/E17.007 |
| 2002/0133504 | A1 * | 9/2002 | Vlahos .................. | G06F 16/256 |
| 2002/0188872 | A1 | 12/2002 | Willeby | |
| 2008/0270514 | A1 * | 10/2008 | Soares Pi Farias ....... | G06F 8/65 709/228 |
| 2012/0089742 | A1 | 4/2012 | Jagannatharao et al. | |
| 2012/0290421 | A1 * | 11/2012 | Qawami ................ | G06F 21/31 705/21 |
| 2014/0115378 | A1 | 4/2014 | Chin et al. | |
| 2016/0253666 | A1 | 9/2016 | Lee et al. | |

* cited by examiner

*Primary Examiner* — Ari Shahabi
(74) *Attorney, Agent, or Firm* — Bookoff McAndrews, PLLC

(57) ABSTRACT

A method of processing payment transactions includes receiving a transaction request from a client device, determining whether a transaction command generator is available, transmitting the transaction request to a transaction command generator, the transaction command generator being an existing transaction command generator or a newly created transaction command generator, receiving generated personal identification number (PIN) pad commands from the transaction command generator, and transmitting the generated PIN pad commands to a PIN pad.

17 Claims, 7 Drawing Sheets

SYSTEMS AND METHODS FOR CLOUD BASED PIN PAD TRANSACTION GENERATION

CROSS-REFERENCE TO RELATED APPLICATION(S)

This patent application is a continuation of and claims the benefit of priority to U.S. application Ser. No. 15/662,516, filed Jul. 28, 2017, the entirety of which is incorporated herein by reference.

TECHNICAL FIELD

Various embodiments of the present disclosure relate generally to electronic payment infrastructure and, more particularly, to generating commands to control client devices for completing payment transactions.

BACKGROUND

Traditionally, merchants and other store owners have point of sale (POS) terminals and POS systems that can accept check or payment card payments from consumers for goods and services. Such POS systems may include PIN pads at which a consumer may enter payment and/or personal information in order to complete payment processing requests for purchases. Communicating with PIN Pads requires translating and interpreting the PIN pad Application Program Interface (API). This typically means establishing a one to one relationship with the PIN pad device for this communication to occur. This is not always the most efficient and effective way to manage a large number of PIN pad devices. Translating and interpreting PIN pad APIs is sometimes a less than adequate utilization of resources because, for every PIN Pad device, there has to be a corresponding resource to manage the transactions to that device. This may cause inconvenience and dissatisfaction for the merchant and the merchant's customers, possibly resulting in decreased revenue for the merchant.

The present disclosure is directed to overcoming one or more of these above-referenced challenges.

SUMMARY OF THE DISCLOSURE

According to certain aspects of the disclosure, systems and methods are disclosed for processing payment transactions.

In one embodiment, a computer-implemented method is disclosed for processing payment transactions. The method includes: receiving a transaction request from a client device, determining whether a transaction command generator is available, transmitting the transaction request to a transaction command generator, the transaction command generator being an existing transaction command generator or a newly created transaction command generator, receiving generated personal identification number (PIN) pad commands from the transaction command generator, and transmitting the generated PIN pad commands to a PIN pad.

According to certain aspects of the disclosure, non-transitory computer readable media are disclosed storing a program causing a computer to execute a method of processing payment transactions, One method comprises: receiving a transaction request from a client device, determining whether a transaction command generator is available, transmitting the transaction request to a transaction command generator, the transaction command generator being an existing transaction command generator or a newly created transaction command generator, receiving generated personal identification number (PIN) pad commands from the transaction command generator, and transmitting the generated PIN pad commands to a PIN pad.

In accordance with another embodiment, a system is disclosed for processing payment transactions. The system comprises: a memory having processor-readable instructions stored therein; and a processor configured to access the memory and execute the processor-readable instructions, which when executed by the processor configures the processor to perform a plurality of functions, including functions to: receive a transaction request from a client device, determine whether a transaction command generator is available, transmit the transaction request to a transaction command generator, the transaction command generator being an existing transaction command generator or a newly created transaction command generator, receive generated personal identification number (PIN) pad commands from the transaction command generator, and transmit the generated PIN pad commands to a PIN pad.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that a variable number of transaction command generators may be available for servicing transaction requests and the transaction command generators provide support for application programming interfaces of differing client devices. The disclosed systems and methods discussed below may allow greater throughput and scalability of the payment processing system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to generating commands to control client devices for completing payment transactions. The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A merchant payment processing system may typically include one or more point of sale (POS) terminals in communication with one or more personal identification number (PIN) pads. Once a customer's transaction entered at the POS device is ready for completion, the POS device may send commands to a PIN pad for interaction with the customer to complete the transaction. This interaction may include presentation of payment credentials, such as a payment vehicle, and entry of customer identification, such as a PIN, biometric information, etc. Each POS device will maintain communication with the associated PIN pad in order to ensure that a customer can complete the transaction. In addition, interaction with a PIN pad may be according to an application programming interface (API) of the PIN pad, which may vary according to the manufacturer, model, release date, and software version of the PIN pad. A transaction to be completed by the PIN pad may, therefore, be presented as commands conforming to the PIN pad API.

Desirably, in order to allow a flexible association between a PIN pad and POS device, a transaction request from a POS device may be processed by an intermediary process to generate a transaction, including PIN pad commands, to be presented to the PIN pad. For example, the merchant's payment processing system may include one or more PIN pad transaction generators. Thus, a PIN pad may not be directly linked with a particular POS device. However, it may be inefficient to provide a dedicated PIN pad transaction generators for each PIN pad. Accordingly, as discussed in detail below, the merchant payment processing system may dynamically generate PIN pad transaction generators and other associated processes on demand based on the needs of the merchant's POS devices and PIN pads.

Figure 6:
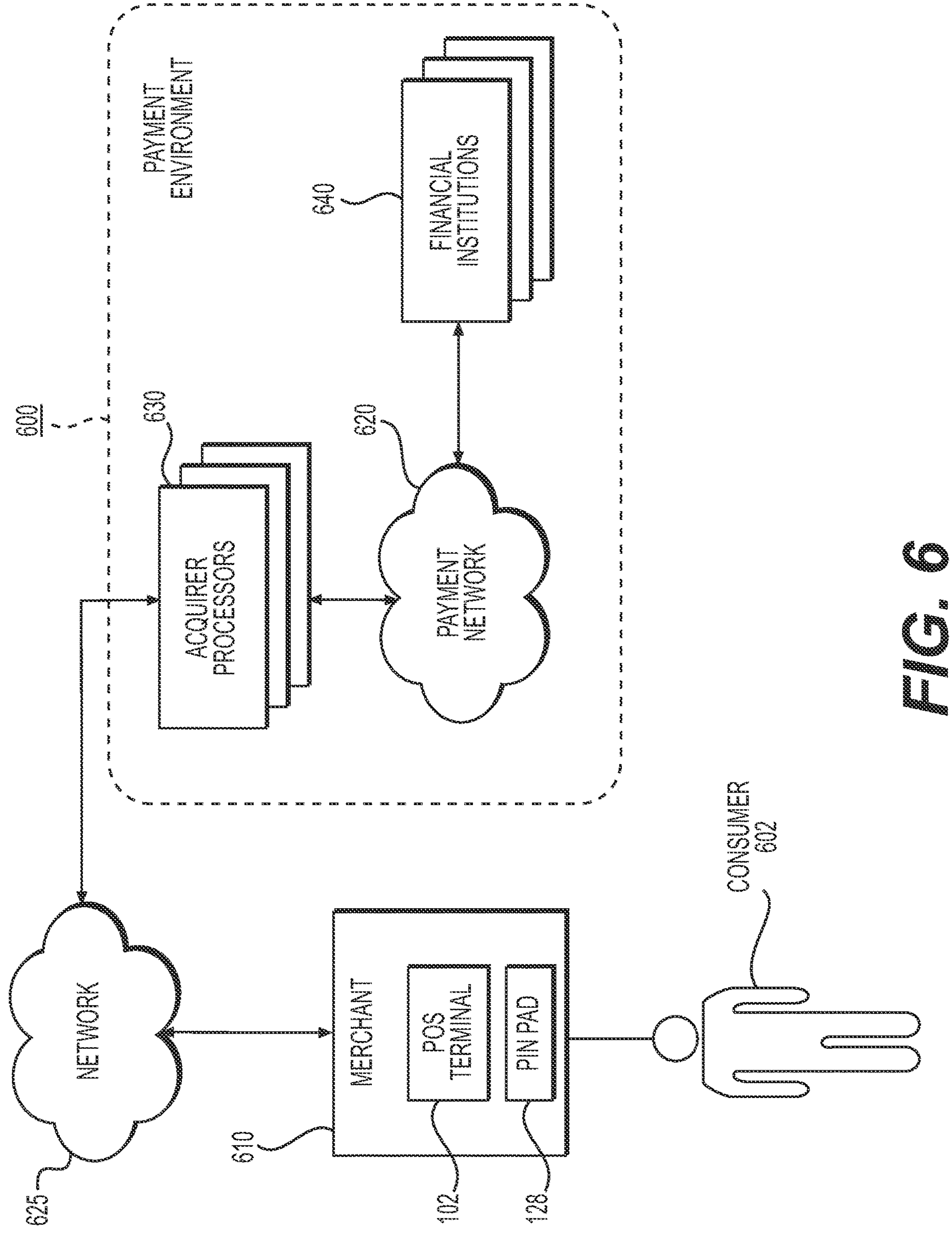
FIG. 6 depicts a block diagram of an electronic payment processing system.

As shown in FIG. 6, in an electronic payment processing system, a consumer 602, during the checkout process with a merchant 610, pays for goods or services from merchant 610 at a PIN Pad 128 associated with POS terminal 102. Consumer 602 may use a payment card as payment and the transaction is processed through a payment environment 600. Because merchant 610 generally can use a different bank or financial institution 640 than consumer 602, an acquirer processor 630 handles the financial transactions that transfer payment between the financial institution 640 of consumer 602 and that of merchant 610. Consumer 602 submits payment information at the PIN Pad 128 associated with POS terminal 102 of merchant 610, such as by swiping his or her payment card, inserting his or her chip-based payment card, through wireless near field communication (NFC), etc., or by any other suitable means. PIN Pad 128 sends a payment request by way of a computer network 625 to an acquirer processor 630. Alternatively, such a request may be sent by a component that controls a flow of a transaction, such as point of sale (POS) engine 106 depicted in FIG. 1. Acquirer processor 630 requests, by way of payment network 620, an electronic transfer of funds from the received funds to the financial institution 640 associated with merchant 610.

Figure 1:
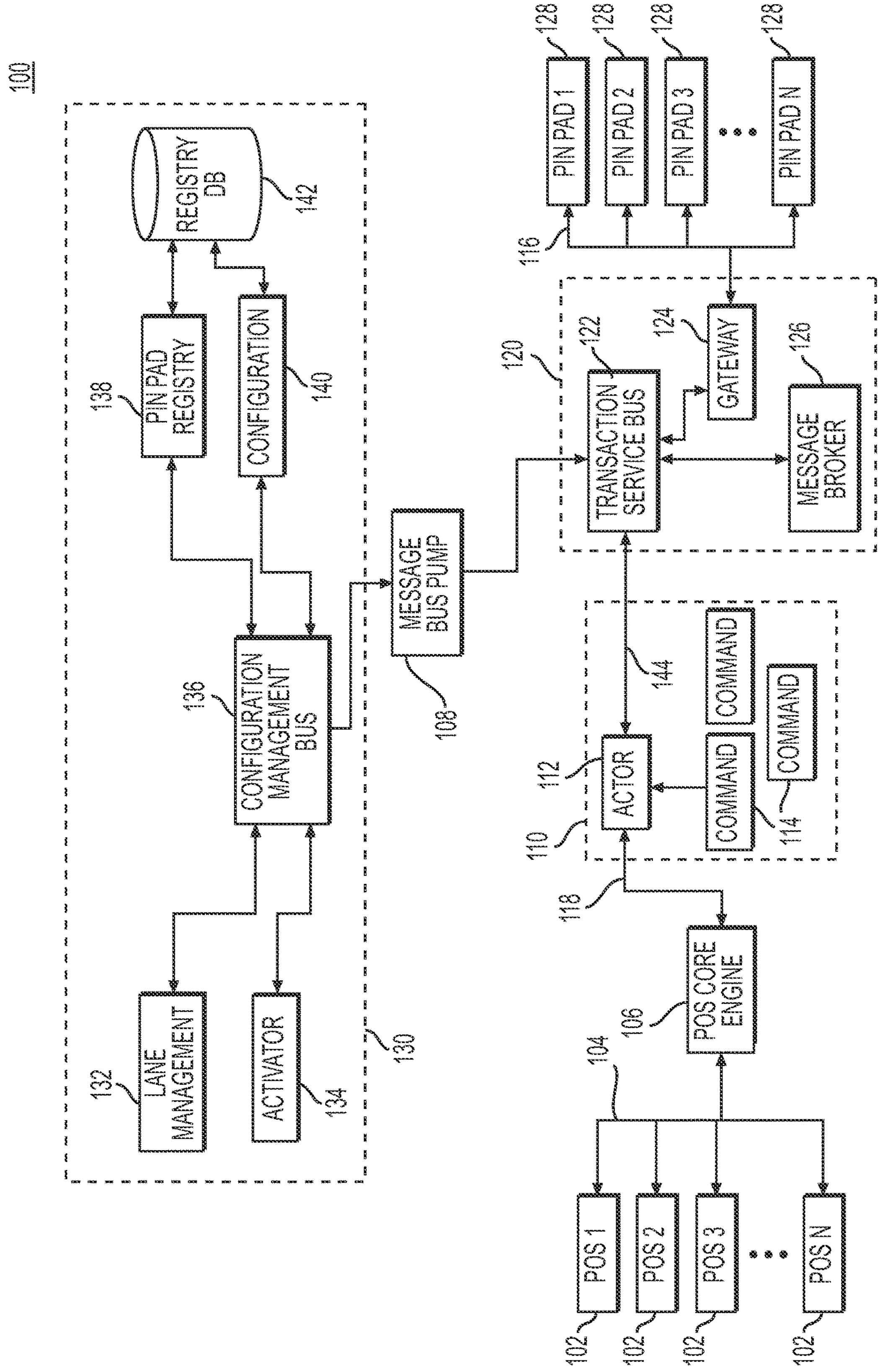
FIG. 1 depicts an exemplary system infrastructure for electronic payment transactions, according to one or more embodiments.
Figure 2:
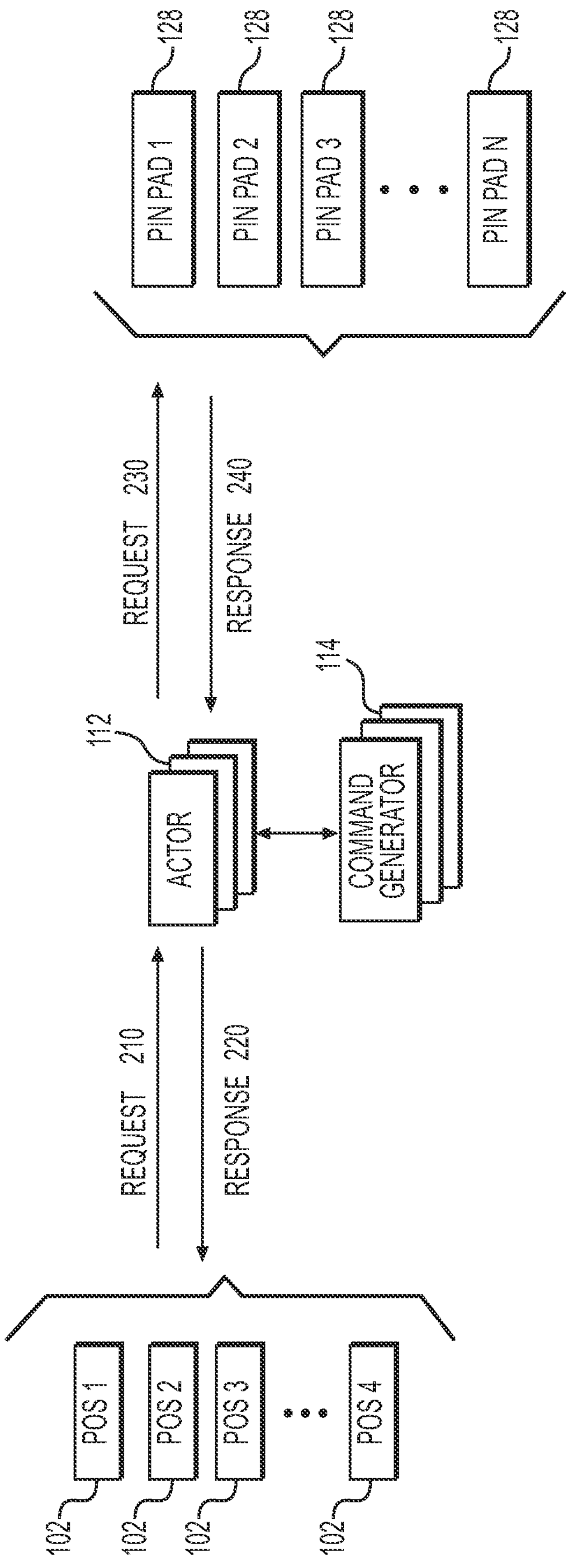
FIG. 2 depicts an exemplary system infrastructure for personal identification (PIN) pad command generation, according to one or more embodiments.

Merchant 610 may provide an infrastructure for processing electronic payment requests. FIGS. 1 and 2 depict an exemplary system infrastructure for payment processing within a merchant environment, according to one or more embodiments.

As shown in FIG. 1, an infrastructure 100 for processing electronic payment requests may include one or more point of sale (POS) devices 102, which may be in communication with a POS engine 106, and one or more personal identification number (PIN) pad terminals 128, which may be in communication with a socket gateway 124. POS devices 102 may communicate a sale request message over computer network 104 to POS engine 106. POS engine 106 may be embodied, for example, as middleware that may transmit commands to control a PIN pad 128, such as by sending a payment request to PIN pad transaction generator 110 over computer network 118. PIN pad transaction generator 110 may generate one or more PIN pad commands 114 for processing by a transaction generator 112. Transaction generator 112 may take in a transaction request from the POS engine 106 and PIN pad specific commands 114 for the transaction. Transaction generator 112 may further take in expected responses from PIN pad 128. Transaction generator 112 may manage the entire transaction using, for example, a state machine for the specific transaction. PIN pad transaction generator 110 will be described in greater detail below with respect to FIG. 2.

Infrastructure 100 for processing electronic payment requests may further include a PIN pad device gateway 120, which may provide commination with PIN pad terminals 128. PIN pad device gateway 120 may include a message broker that may process incoming sales transaction messages, a transaction service bus topic 122, and one or more device gateways 124.

As shown in FIG. 1, infrastructure 100 may further include a configuration management service 130, which may provide configuration services for PIN pad terminals 128. Configuration management service 130 may include a configuration service 140, a PIN pad registry 138, and a PIN pad database 142. Configuration service 140 may, if necessary, configure the PIN pad upon connection of the PIN pad to the infrastructure. PIN pad registry 138 and PIN pad database 142 may maintain data associating each PIN pad with an account or merchant. Configuration management service 130 may further include a lane management service 132 and a PIN Pad activator 134.

Infrastructure 100 may be embodied as a semi-integrated solution and may further control the PIN pad on behalf of the POS device software. Such control may include controlling a transaction flow or sequence including, for example, prompting for payment card swipe or insert, sending a transaction request for authorization, prompting for a consumer signature, etc.

Turning to FIG. 2, PIN pad transaction generator 110 may receive a transaction request 210 from, for example, a backend service or application, or from a client device such as point of sale device 102. Transaction generator 110 may then determine whether a transaction generator actor 112 is available to service the transaction request. If no transaction generator actor 112 is available to service the transaction request, then PIN pad transaction generator 110 may create a new transaction generator actor 112. Transaction generator actor 112 may then create a transaction command generator 114 to generate commands to be transmitted to a PIN pad for the transaction request. Alternatively, transaction generator actor 112 may select an available transaction command generator 114 from a pool of idle transaction command generators 114. Transaction command generator 114 may generate PIN pad commands to be transmitted to a client device, such as PIN pad 128, according to the contents of transaction request 210 including, for example, the transaction type and expected responses from the client device. A new transaction request including the generated PIN pad commands may be transmitted to PIN pad 128 as transaction request 230. A transaction response 240 may be received from PIN pad 128 and further processed by PIN pad transaction generator 110 before being transmitted to POS device 102 as transaction response 220.

The merchant transaction processing system may include any number of POS devices 102 and PIN pads 128. However, it may be inefficient or inconvenient to maintain a dedicated transaction generator actor 112 and transaction command generator 114 for each of these devices. Accordingly, PIN pad transaction generator 110 may generate a new transaction generator actor 112 or transaction command generator 114 only when needed in order to process a transaction request. PIN pad transaction generator 110 may maintain a transaction generator actor 112 and transaction command generator 114 for each active transaction request and may terminate either transaction generator actor 112 or transaction command generator 114 when the associated transaction request has been completed. Alternatively, PIN pad transaction generator 110 may maintain a minimum number of transaction generator actors 112 and transaction command generators 114 that may be greater than the number of active transaction requests. This may allow a transaction request to be processed using existing services without the delay of generating a new transaction generator actor 112 or transaction command generator 114. A newly generated transaction generator actor 112 or transaction command generator 114 may remain active even after the associated transaction request is completed, thus increasing the pool of available transaction generator actors 112 and transaction command generators 114. If the number of transaction generator actors 112 and transaction command generators 114 that are not associated with an active transaction requests exceeds a threshold then one or more transaction generator actors 112 or transaction command generators 114 may be terminated in order to free allocated resources.

The operation of PIN pad transaction generator 110, transaction generator actor 112, and transaction command generator 114 will be further described below with respect to FIGS. 3-5.

Figure 3:
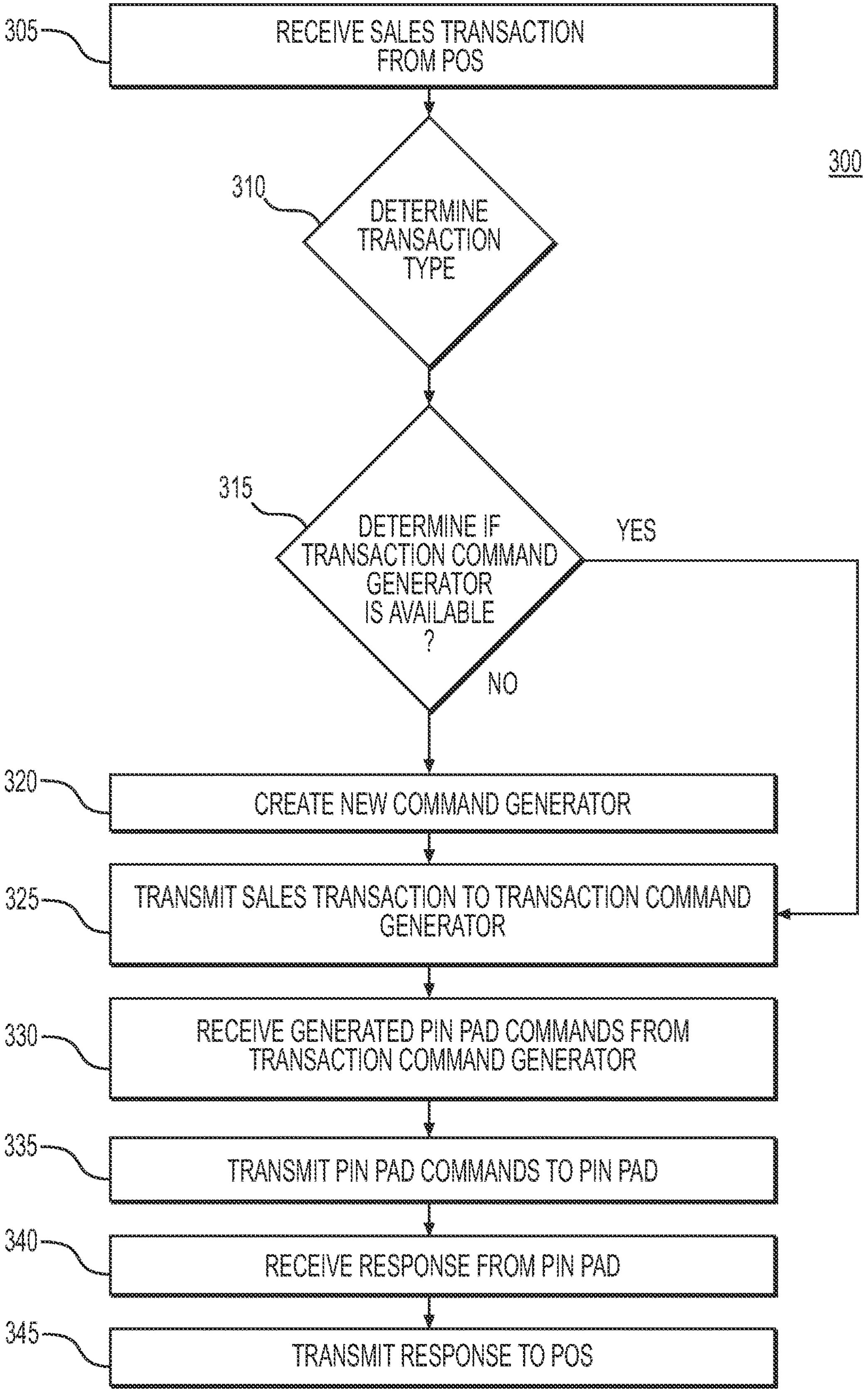
FIG. 3 depicts a flowchart of a method of PIN pad command generation, according to one or more embodiments.

FIG. 3 depicts a flowchart of a method of PIN pad command generation, according to one or more embodiments. As shown in FIG. 3, at operation 305, a transaction generator, such as transaction generator 112 depicted in FIG. 2, may receive a sales transaction request from a point of sale (POS) device, such as POS device 102 depicted in FIGS. 1 and 2. At operation 310, the transaction generator may determine a transaction type of the received transaction request. For example, the transaction request may be one of a purchase transaction, a refund transaction, a void transaction, a balance request transaction, etc. At operation 315, the transaction generator may determine if a PIN pad command generator, such as PIN pad command generator 114 depicted in FIGS. 1 and 2, is available to service the transaction request. If no PIN pad command generator is available to service the transaction request, then at operation 320, the transaction generator may create a new PIN pad command generator. At operation 325, the transaction generator may transmit the sales transaction to the PIN pad command generator. At operation 330, the transaction generator may receive generated pin pad commands from the PIN pad command generator. At operation 335, the transaction generator may transmit the generated pin pad commands to a PIN pad, such as PIN pad 128 depicted in FIGS. 1 and 2. At operation 340, the transaction generator may receive a response from pin pad. At operation 345, the transaction generator may transmit the response to the POS device.

Figure 4:
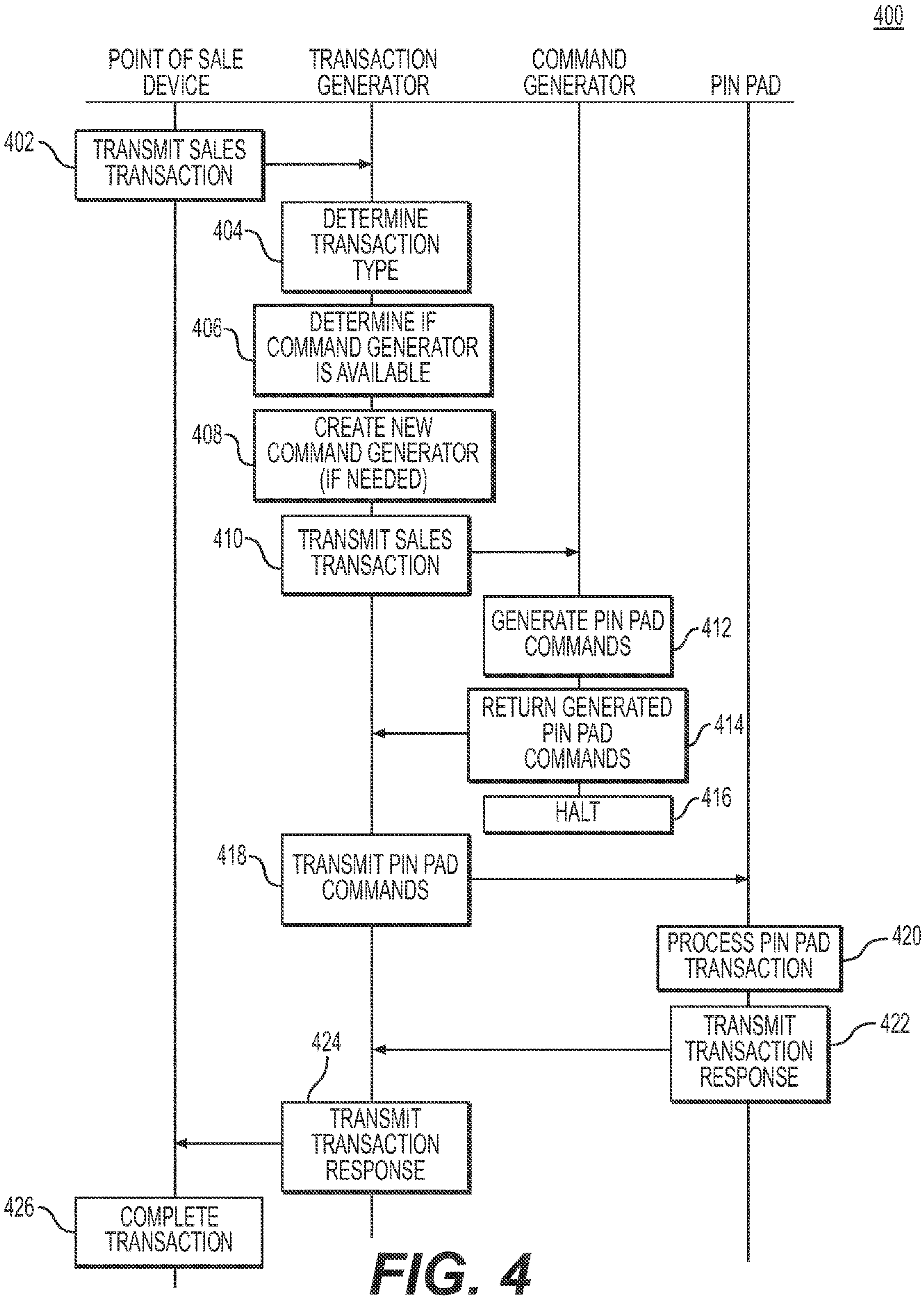
FIG. 4 depicts a communication flow diagram of a method of PIN pad command generation, according to one or more embodiments.

FIG. 4 depicts a communication flow diagram of a method of pin pad command generation, according to one or more embodiments. As shown in FIG. 4, at operation 402, a point of sale device (POS), such a POS device 102 depicted in FIGS. 1 and 2, may transmit a sales transaction to a transaction generator, such as transaction generator 112 depicted in FIGS. 1 and 2. At operation 404, the transaction generator may determine a transaction type of the sales transaction. At operation 406, the transaction generator may determine if a PIN pad command generator, such as command generator 114 depicted in FIGS. 1 and 2, is available. At operation 408, the transaction generator may create new PIN pad command generator, if needed. At operation 410, the transaction generator may transmit sales transaction to the PIN pad command generator. At operation 412, the PIN pad command generator may generate PIN pad commands for the sales transaction. At operation 414, the PIN pad command generator may return the generated PIN pad commands for the sales transaction to the transaction generator. At operation 416, the PIN pad command generator may halt and release any resources that were allocated to the PIN pad generator. At operation 418, the transaction generator may transmit the generated PIN pad commands to a PIN pad, such as PIN pad 128 depicted in FIGS. 1 and 2. At operation 420, the PIN pad may process the sales transaction according to the generated PIN pad commands. At operation 422, the PIN pad may transmit a transaction response based on the processing results of the PIN pad commands. At operation 424, the transaction generator may transmit the received transaction response to the POS device. At operation 426, the POS device may complete the sales transaction.

Figure 5:
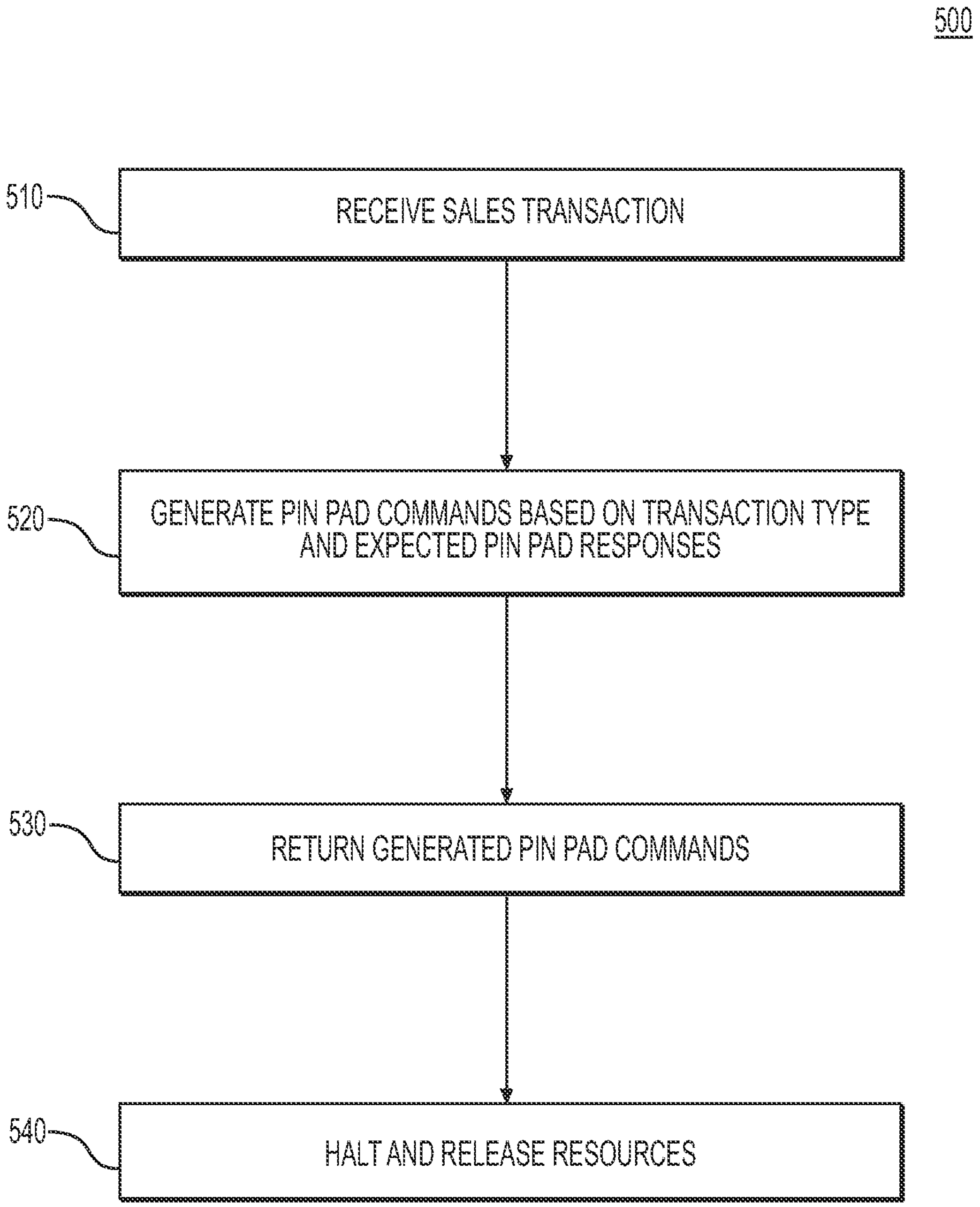
FIG. 5 depicts a flowchart of a method of PIN pad command generation, according to one or more embodiments.

FIG. 5 depicts a flowchart of a method of PIN pad command generation, according to one or more embodiments. As shown in FIG. 5, at operation 510, a PIN pad command generator, such as command generator 114 depicted in FIGS. 1 and 2, may receive sales transaction from a transaction generator, such as transaction generator 112 depicted in FIG. 2. At operation 520, the PIN pad command generator may generate PIN Pad commands based on a transaction type and expected PIN Pad responses of the received sales transaction. At operation 530, the PIN pad command generator may return the generated PIN Pad commands to the transaction generator. At operation 540, the PIN pad command generator may halt and release resources.

Any suitable system infrastructure may be put into place to provide a cloud based device gateway. FIGS. 1, 2, and 6 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1, 2 and 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 7:
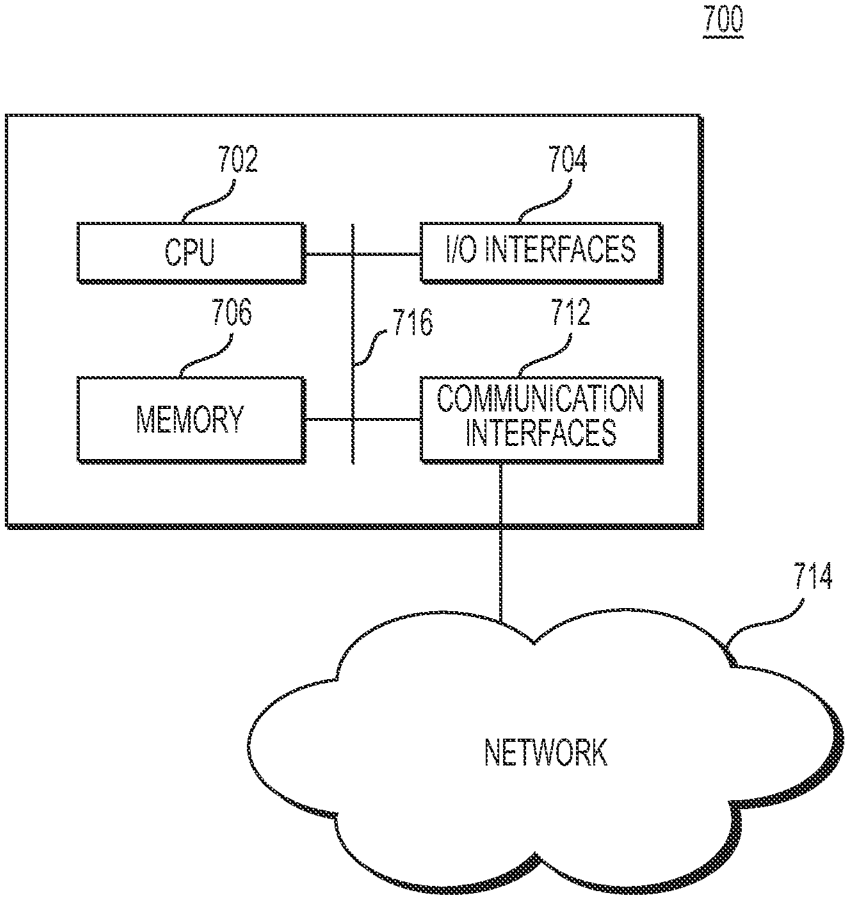
FIG. 7 is a block diagram of an example computing environment, according to one or more embodiments.

The systems and processes described above may be performed on or between one or more computing devices. FIG. 7 illustrates an example computing device. A computing device 700 may be a server, a computing device that is integrated with other systems or subsystems, a mobile computing device such as a smart phone, a cloud-based computing ability, and so forth. The computing device 700 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 700 includes a processor 702 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 700 also includes one or more memories 706, for example read-only memory (ROM), random access memory (RAM), cache memory associated with the processor 702, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 702, or memories 706 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 708 may be configured to transmit to, or receive data from, other computing devices 700 across a network 712. The network and communication interfaces 708 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 708 may include wire data transmission links such as Ethernet and TCP/IP. The communication interfaces 708 may include wireless protocols for interfacing with private or public networks 712. For example, the network and communication interfaces 708 and protocols may include interfaces for communicating with private wireless networks such as Wi-Fi network, one of the IEEE 802.11x family of networks, or another suitable wireless network. The network and communication interfaces 708 may include interfaces and protocols for communicating with public wireless networks 708, using for example wireless protocols used by cellular network providers, including Code Division Multiple Access (CDMA) and Global System for Mobile Communications (GSM). A computing device 700 may use network and communication interfaces 708 to communicate with hardware modules such as a database or data store, or one or more servers or other networked computing resources. Data may be encrypted or protected from unauthorized access.

In various configurations, the computing device 700 may include a system bus 710 for interconnecting the various components of the computing device 700, or the computing device 700 may be integrated into one or more chips such as programmable logic device or application specific integrated circuit (ASIC). The system bus 710 may include a memory controller, a local bus, or a peripheral bus for supporting input and output devices 704, and communication interfaces 708. Example input and output devices 704 include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of processing payment transactions using a payment processing system, the method comprising:

receiving, at a transaction generator of the payment processing system, a transaction request from a point of sale (POS) device;

determining, using the transaction generator, that an absence of idle transaction command generators in a pool of idle transaction command generators exists;

constructing, using the transaction generator, a transaction command generator to service the transaction request based on determining that the absence of idle transaction command generators exists;

generating, using the transaction command generator, personal identification number (PIN) pad commands to be transmitted to a PIN pad according to contents of the transaction request;

transmitting, using the transaction generator, a new transaction request including the generated PIN pad commands to the PIN pad for processing according to the generated PIN pad commands;

adding, using the transaction generator, the transaction command generator to the pool of idle transaction command generators;

in response to the adding, determining, using the transaction generator, that a number of idle transaction command generators in the pool of idle transaction command generators exceeds a threshold number; and terminating, using the transaction generator, at least one idle transaction command generator in the pool of idle transaction command generators.

2. The method of claim 1, wherein generating the PIN pad commands comprises generating the PIN pad commands according to a transaction type and one or more expected responses from the PIN pad.

3. The method of claim 2, wherein the transaction type is selected from the group consisting of: a purchase transaction, a refund transaction, a void transaction, and a balance request transaction.

4. The method of claim 1, further comprising:

controlling, using the payment processing system, a configuration management service associated with the payment processing system to provide a configuration service to the PIN pad upon connection of the PIN pad to the payment processing system.

5. The method of claim 4, wherein the configuration service is configured to utilize data contained in a PIN pad registry and a PIN pad database of the configuration management service to provide the configuration service.

6. The method of claim 1, further comprising:

receiving, at the transaction generator, a transaction response from the PIN pad; and transmitting, using the transaction command generator, the transaction response to the POS device.

7. A computer system for processing payment transactions, the computer system comprising:

a memory having processor-readable instructions stored therein;

a transaction generator; and a processor configured to access the memory and execute the processor-readable instructions, which when executed by the processor cause the transaction generator to perform operations including:

receiving, at the transaction generator, a transaction request from a point of sale (POS) device;

determining, using the transaction generator, that an absence of idle transaction command generators in a pool of idle transaction commands generators exists;

constructing, using the transaction generator, a transaction command generator in the memory to service the transaction request based on determining that the absence of idle transaction command generators exists;

generating, using the transaction command generator, personal identification number (PIN) pad commands to be transmitted to a PIN pad according to contents of the transaction request;

transmitting, using the transaction generator, a new transaction request including the generated PIN pad commands to the PIN pad for processing according to the generated PIN pad commands;

adding, using the transaction generator, the transaction command generator to the pool of idle transaction command generators;

in response to the adding, determining, using the transaction generator, that a number of idle transaction command generators in the pool of idle transaction command generators exceeds a threshold number; and terminating, using the transaction generator, at least one idle transaction command generator in the pool of idle transaction command generators.

8. The computer system of claim 7, wherein generating the PIN pad commands comprises generating the PIN pad commands according to a transaction type and one or more expected responses from the PIN pad.

9. The computer system of claim 8, wherein the transaction type is selected from the group consisting of: a purchase transaction, a refund transaction, a void transaction, and a balance request transaction.

10. The computer system of claim 7, wherein the operations further include:

controlling a configuration management service associated with a payment processing system to provide a configuration service to the PIN pad upon connection of the PIN pad to the computer system.

11. The computer system of claim 10, wherein the configuration service is configured to utilize data contained in a PIN pad registry and a PIN pad database of the configuration management service to provide the configuration service.

12. The computer system of claim 7, wherein the operations further include:

receiving, at the transaction generator, a transaction response from the PIN pad; and transmitting, using the transaction command generator, the transaction response to the POS device.

13. A non-transitory computer readable medium storing instructions, that when executed by a processor cause a transaction generator to perform a method of processing payment transactions using a payment processing system, the method comprising:

receiving, at the transaction generator, a transaction request from a point of sale (POS) device;

determining, using the transaction generator, that an absence of idle transaction command generators in a pool of idle transaction command generators exists;

constructing, using the transaction generator, a transaction command generator to service the transaction request based on determining that the absence of idle transaction command generators exists;

generating, using the transaction command generator, personal identification number (PIN) pad commands to be transmitted to a PIN pad according to contents of the transaction request;

transmitting, using the transaction generator, a new transaction request including the generated PIN pad commands to the PIN pad for processing according to the generated PIN pad commands;

adding, using the transaction generator, the transaction command generator to the pool of idle transaction command generators;

in response to the adding, determining, using the transaction generator, that a number of idle transaction command generators in the pool of idle transaction command generators exceeds a threshold number; and terminating, using the transaction generator, at least one idle transaction command generator in the pool of idle transaction command generators.

14. The non-transitory computer readable medium of claim 13, wherein generating the PIN pad commands comprises generating the PIN pad commands according to a transaction type and one or more expected responses from the PIN pad.

15. The non-transitory computer readable medium of claim 14, wherein the transaction type is selected from the group consisting of: a purchase transaction, a refund transaction, a void transaction, and a balance request transaction.

16. The non-transitory computer readable medium of claim 13, the method further comprising:

controlling, using the payment processing system, a configuration management service associated with the payment processing system to provide a configuration service to the PIN pad upon connection of the PIN pad to the payment processing system.

17. The non-transitory computer readable medium of claim 13, the method further comprising:

receiving, at the transaction generator, a transaction response from the PIN pad; and transmitting, using the transaction command generator, the transaction response to the POS device.

* * * * *